United States Patent [19]
Jackson

[11] 3,937,658
[45] Feb. 10, 1976

[54] ELECTROLYTIC ZINC REFINING PROCESS INCLUDING PRODUCTION OF BY-PRODUCTS FROM JAROSITE RESIDUES

[76] Inventor: David A. Jackson, 330 W. Diversey Parkway, Chicago, Ill. 60657

[22] Filed: Dec. 24, 1974

[21] Appl. No.: 536,093

Related U.S. Application Data

[62] Division of Ser. No. 377,623, July 9, 1973, Pat. No. 3,871,859.

[52] U.S. Cl.................................. 204/119; 423/146
[51] Int. Cl.$^2$........................................... C25C 1/16
[58] Field of Search...................... 204/119; 423/146

[56] References Cited
UNITED STATES PATENTS

| | | | |
|---|---|---|---|
| 3,434,947 | 3/1969 | Steintveit | 204/119 |
| 3,684,490 | 8/1972 | Steintveit | 75/115 |

*Primary Examiner*—R. L. Andrews
*Attorney, Agent, or Firm*—Darbo, Robertson & Vandenburgh

[57] ABSTRACT

The jarosite process of electrolytic refining of zinc is extended and improved by treating the jarosite residues to recover valuable by-products. The wet jarosite residue is acidified with sulphuric acid from the refining process acid plant to redissolve the iron sulphate, producing a liquid containing dissolved plant nutrients. A substantial part of the iron sulphate is removed by fractional crystallization and the mother liquor is heated to drive off water and produce dry nutrient sulphates to which super phosphate, formed by treating phosphate rock or bone with acid from the refinery acid plant to produce a final enriched fertilizer product.

The iron sulphate solution may be heated to drive off water and roasted to produce iron oxide. If desired, the iron oxide may be reduced to metallic iron.

Water and sulphur products produced in the treatment of the jarosite residues are recovered and integrated into the refinery plant circuits.

11 Claims, 2 Drawing Figures

3,937,658

ELECTROLYTIC ZINC REFINING PROCESS INCLUDING PRODUCTION OF BY-PRODUCTS FROM JAROSITE RESIDUES

RELATED APPLICATION

This application is a division of application Ser. No. 377,623, filed July 9, 1973 now Pat. No. 3,871,859 dated Mar. 18, 1975.

BACKGROUND AND SUMMARY OF THE INVENTION

As a step in the process of the electrolytic refining of zinc from zinc ore concentrate, iron, which is usually present in substantial quantity, is separated from the zinc by precipitation of complex basic iron sulphate from a solution of iron and zinc sulphate (plus minor components) in the presence of ammonium, potassium or sodium ions. These iron sulphate compounds are very similar to the jarosite found in nature and may be and hereinafter are referred to as jarosite residues, this term including, also, other metal sulphates and materials filtered out with the jarosite compounds. What may be called the "Jarosite Process" in zinc refining is described in a book publication entitled, AIME World Symposium on Mining & Metallurgy of Lead & Zinc, Volume II, Extractive Metallurgy of Lead and Zinc, published in 1970 by The American Institute of Mining, Metallurgical and Petroleum Engineers, Inc., Library of Congress Catalogue Card Number 78-132404, beginning on Page 229. The precipitation iron-zinc separation process resulting in the formation of the jarosite; i.e., the jarosite process, is also described in U.S. Pat. No. 3,434,947 which is incorporated herein by reference.

The jarosite residues have heretofore been regarded and disposed of as an entirely useless waste product. Produced in very copious quantities, the disposal of this material has presented problems involving the acquisition and use of dumping ground and the very substantial cost of handling the material.

The ammonium jarosite produced by the separation precipitation in the presence of ammonium ions may be represented by the formula: $(NH_4)_2Fe_6(SO_4)_4(OH)_{12}$. In addition to ammonia and iron in the jarosite, the residue also contains zinc and manganese and generally copper and other trace metals. These elements are useful plant nutrients and the jarosite residues offer substantial values as fertilizer. The discovery of the value of these residues converts a troublesome, heretofore wasted by-product to a useful and valuable material.

An object of the invention is to provide a modified jarosite process of electrolytic refining of zinc wherein the production of a useful jarosite residue fertilizer is integrated with the known refining process. With the addition of superphosphate, a fertilizer containing nitrogen, phosphorus and potassium, as well as useful metallic trace elements, is produced. Sulphuric acid, formed as a by-product in the roasting of the zinc ore concentrates, may be used in the treatment of phosphate rock or bone to produce the superphosphate in a further integration of the fertilizer production and refining process.

Another object, important in certain areas of the world, is to recover process water which may be reused. In another aspect of the invention, iron is recovered from the jarosite residue by fractional crystallization or iron sulphate from the redissolved sulphate solution, leaving the balance of the iron in the residue for fertilizer utilization. The separated iron sulphate may be roasted to drive off sulphur oxides and the iron oxides so produced may be further treated to produce metallic iron. The sulphuric oxides are returned to the acid plant of the refinery.

Other objects and the advantages of the invention will become apparent as the description thereof proceeds.

DESCRIPTION OF SPECIFIC EMBODIMENT

In the process of producing and refining zinc as described, for example, in U.S. Pat. No. 3,434,947, the zinc sulphide ore concentrates are roasted to produce calcine. The calcine, containing iron and other metals as well as zinc, is subjected to a neutral leaching with $H_2SO_4$ under such conditions that as little iron as possible is dissolved, the solution, after purifying, being electrolyzed and separated from the residue. This residue, containing zinc and iron and other metals, is subjected to a strong acid leaching. In this process, the zinc ferrites are decomposed and a final residue containing the lead and silver of the zinc ore is removed at this point. The zinc, copper, cadmium and iron are dissolved by the hot acid leach. The remaining and important step in the zinc production and refining process is the separation of the iron and zinc in this solution. This is the jarosite precipitation.

While maintaining a temperature of about 95° C., a neutralizing agent is gradually added to the decanted acid sulphate solution. This neutralizing agent may be zinc oxide. During the course of from three to four hours, while maintaining the solution at a maximum acidity of pH 1.5, the iron is precipitated as basic sulphate. This precipitation is particularly complete and the precipitate crystalline and therefore easily removable when the precipitation is carried out in the presence of an added ion selected from the group consisting of potassium, sodium or ammonium. The resulting solution is recycled to the neutral leach and the solid precipitate, herein referred to as "jarosite residue" is left as a waste material.

Figure 1:
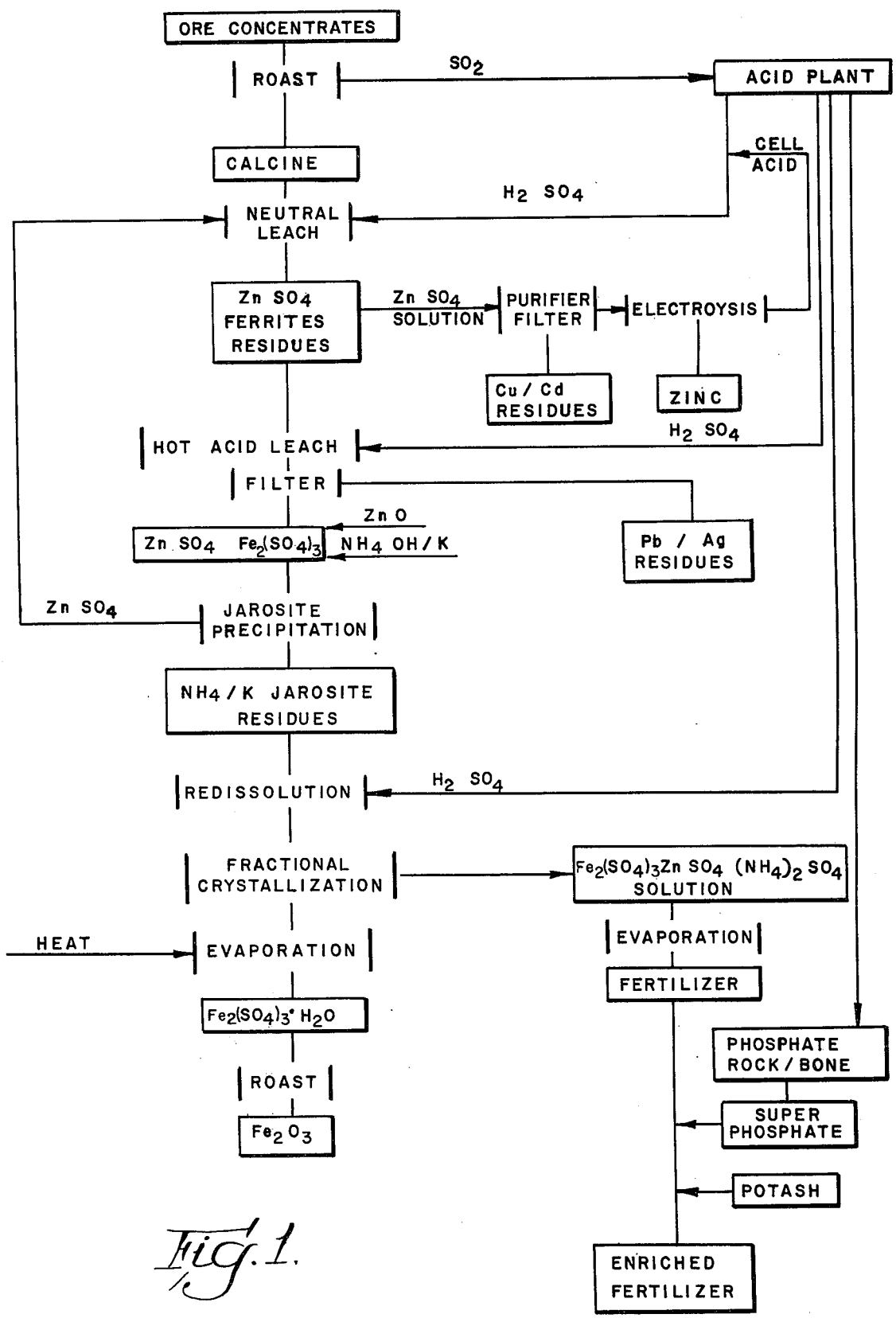
FIG. 1 is a flow diagram showing the production of fertilizer and iron oxide in the electrolytic refining of zinc including the jarosite precipitation.
Figure 2:
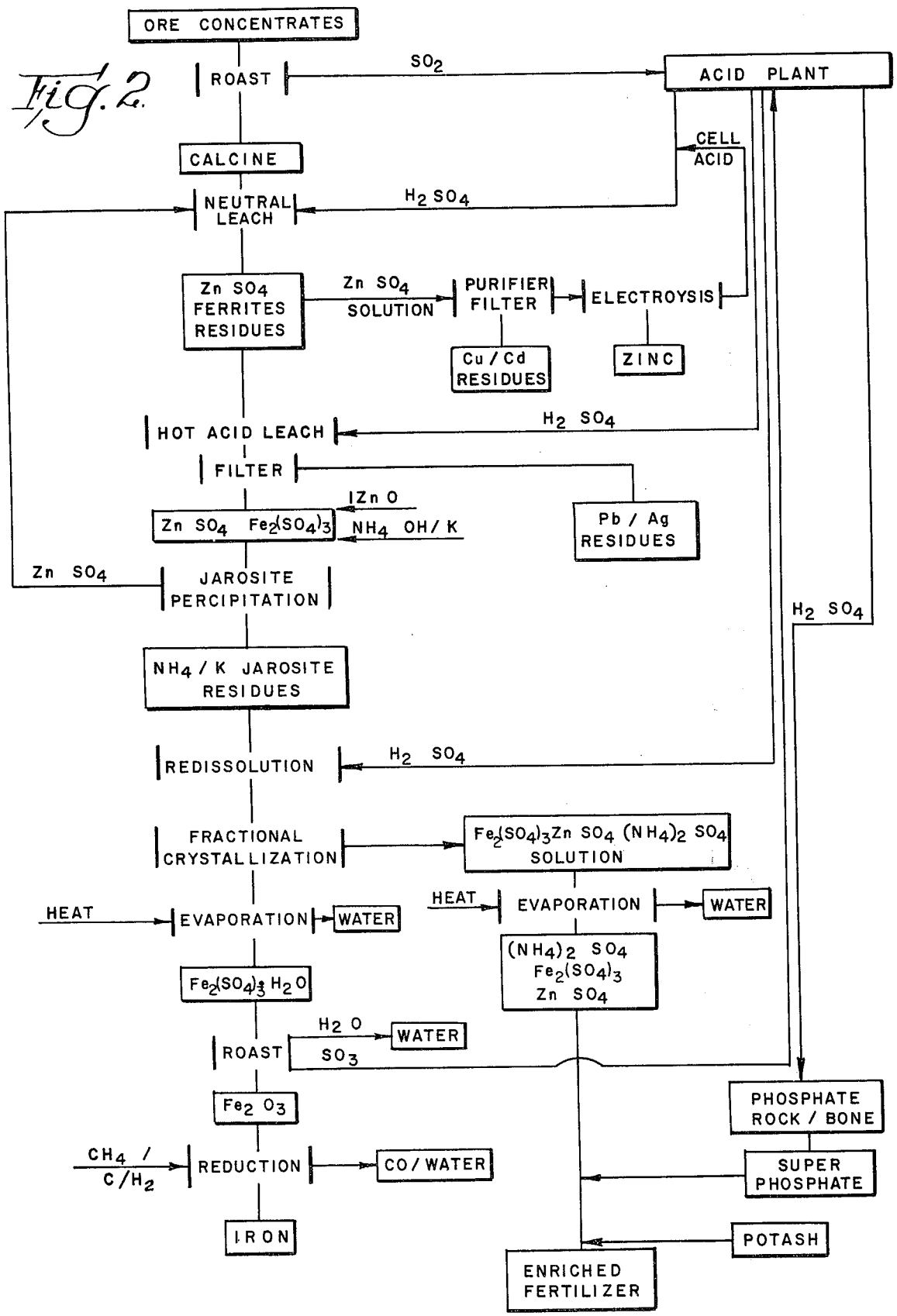
FIG. 2 is a flow diagram similar to that of FIG. 1 and showing extension and refinement of the process for the production of additional valuable by-products, especially iron, sulphur oxides and water.

In accordance with the invention, the jarosite residues so produced in what may be called the jarosite process of electrolytic refining of zinc, as described and as represented in the flow diagrams of FIGS. 1 and 2, are treated with sulphuric acid from the refining process acid plant to produce a useful fertilizer material which may be used as such or as a component of an enriched fertilizer product. They may be used both as the source of recovered iron values and fertilizer products.

If, in accordance with the process as described, precipitation of the complex basic iron sulphate is brought about from the iron and zinc sulphate solution in the presence of ammonium ions, the ammonium jarosites are produced. If it is desired to incorporate at least a proportionate part of potassium in the jarosite residues, a source of potassium ions, compatible with the electrolytic solutions, may be supplied along with the ammonium ions in the solution as a part of the iron-zinc separation process, whereby ammonium and potassium jarosites are coprecipitated.

If desired, to provide available potassium in the fertilizer product, potash or other source of potassium may be added to the normal ammonium jarosite residue fertilizer products. To provide phosphates, superphosphate may also be blended with the ammonium and/or potassium jarosite residue products.

Advantageously, and in accordance with the invention, the production of enriched fertilizer may be planned and the process for producing it integrated with the jarosite process of electrolytic refining of zinc. Along with the production of jarosite, superphosphate may be produced by the treatment of phosphate rock or bone by sulphuric acid formed as a by-product in the roasting of the zinc ore concentrates and the superphosphate so formed admixed with the jarosite residues. The resulting product may be dried and bagged for shipment. If desired, potash or an equivalent source of available potassium may be added to the fertilizer product.

To reduce the proportionate part of iron in the fertilizer product, the redissolved jarosite residue, containing the iron and ammonium (and other metal) sulphates, is heated to drive off free water and fractionally crystallize out a part of the iron sulphate. The equilibrium solution, the mother liquor containing the principal sulphates in approximately the proportion of 50% ammonium, 30% zinc and 20% iron, is then decanted off and may be dried for fertilizer. The removed solid iron sulphate is recovered as a valuable product.

If desired, the iron sulphate so separated may be dried and roasted to drive off all volatile materials, leaving the iron oxide as a valuable by-product material. The water and sulphur products driven off are recovered for use in the plant processes.

Referring to FIG. 1, the known jarosite process of electrolytic refining is represented, resulting in the production of the waste ammonium jarosite residues. In accordance with the invention, these residues are treated with sulphuric acid from the acid plant of the refining operation to redissolve the solids which iron sulphate is precipitated by fractional crystallization. The mother liquor, a solution of iron, zinc and ammonium sulphates with other salts in trace quantities, is heated to evaporate the water and produce a dry fertilizer. Meanwhile, the iron sulphate crystallized out is dried and roasted to produce iron oxide, sulphur oxides and/or acid and water.

As is shown in FIG. 2, the iron oxide produced by roasting the iron sulphate crystals may be reduced to metallic iron by treatment with natural gas, carbon or hydrogen from many available sources in known manner. Depending upon the reduction process employed, powdered or sponge iron is produced.

As is indicated in the flow diagrams, the treatment of the jarosite residues results in the production of valuable component parts with minimum waste to be disposed of. Substantial quantities of high quality iron or iron oxide are recovered and the sulphate products are utilized as fertilizer. Sulphur oxides are recovered for further use in the processes of the refinery. In areas where water is scarce, it is recovered from the several processes in which it is produced so that the entire zinc refining plant can be operated with additions of water required principally to replace evaporation losses.

ACHIEVEMENT

It will be understood that this invention provides an improved electrolytic zinc refining process in that it produces valuable by-products instead of a material which has heretofore been regarded as quite useless. In so doing, the invention recycles waste materials and avoids pollution of the environment. It solves the problem of disposal of the jarosite residues, a problem that heretofore involved considerable expense, the appropriation of increasingly scarce land areas for dumping, and the danger of polluting the soil and ground waters.

Directed to an integrated jarosite process of zinc refining and by-product utilization, the invention involves alternative processes and by-products. The iron values may be realized in use of the iron sulphate crystals, as such, as the iron oxide, or as the ultimate metallic iron in powder or sponge form. The fertilizer value may be realized as the mother liquor of the fractional crystallization process as a liquid fertilizer or as the dried solute from this solution. This fertilizer material will contain potassium if potassium is introduced along with ammonia in the jarosite precipitation. The dry fertilizer product may be enriched by the admixture therewith of superphosphate produced with the use of refinery plant acid and potash to provide a more complete plant fertilizer.

The economics of the jarosite process of zinc refining are very greatly enhanced by the recovery of valuable by-products from otherwise waste material as products useful as such or as process materials useful in the refinery plant.

I Claim:

1. In a plant system for the electrolytic refining of zinc using the jarosite process, the process of treating the jarosite residue waste material to recover valuable by-products therefrom comprising acidifying the wet jarosite residue with sulphuric acid from the refining system acid plant only sufficiently to break down the basic sulphate and redissolve the iron sulphate to produce a solution containing dissolved plant nutrients including the sulphates of iron, ammonium, zinc, manganese and trace metals and thereafter withdrawing said solution from said plant system and treating said solution to recover the solute values thereof.

2. The process of claim 1 and including the additional steps of evaporating sufficient free water from the solution to fractionally crystallize out a substantial part of the iron sulphate, and drying and roasting the iron sulphate crystals to drive off water and sulphur products and produce iron oxide, and recovering and conducting the sulphur products to the acid plant of the refinery.

3. The process of claim 2 and including the additional step of evaporating off the water of the mother liquor to produce a dry plant fertilizer.

4. The process of claim 3 with the additional steps of treating a phosphate-containing raw material selected from the group phosphate rock and bone with sulphuric acid produced in previous steps in the zinc refining process to produce superphosphate, and admixing superphosphate so formed with the dry fertilizer.

5. The process of claim 2 wherein the water is recovered and returned to the refinery plant system.

6. The process of claim 2 and including the additional step of reducing the iron oxide to produce metallic iron.

7. The process of claim 1 and including the additional step of evaporating off the water of the solution to produce a dry plant fertilizer.

8. The process of claim 7 wherein the water is recovered and returned to the refinery plant system.

9. The process of claim 7 with the additional steps of treating a phosphate-containing raw material selected from the group phosphate rock and bone with sulphuric acid produced in previous steps in the zinc refining process to produce superphosphate, and admixing superphosphate so formed with the dry fertilizer.

10. In the jarosite process of electrolytic refining of zinc, the process of treating the jarosite residues to recover valuable by-products therefrom comprising the steps of acidifying the wet jarosite residue with sulphuric acid from the refining process acid plant sufficiently to break down the basic sulphate and redissolve the iron sulphate to produce a liquid containing dissolved plant nutrients including the sulphates of iron, ammonium, zinc, manganese and trace metals, evaporating sufficient free water from the liquid to fractionally crystallize out a substantial part of the iron sulphate, drying and roasting the iron sulphate crystals to form iron oxide and sulphur products, conducting the sulphur products to the acid plant, reducing the iron oxide to produce metallic iron, heating the mother liquor from the fractional crystallization to drive off water to produce fertilizer solids, treating phosphate rock with acid from the acid plant to produce superphosphate, and admixing the superphosphate with the fertilizer solids to produce an enriched plant fertilizer.

11. The process of claim 10 wherein substantially all water removed and produced in any step thereof is recovered and re-used in the electrolytic refining process.

* * * * *